US007713568B2

(12) United States Patent
Hardesty et al.

(10) Patent No.: US 7,713,568 B2
(45) Date of Patent: *May 11, 2010

(54) METHOD OF MAKING COFFEE COMPOSITIONS WITH STABLE FLAVOR CHARACTERISTICS

(75) Inventors: Douglas Craig Hardesty, Amelia, OH (US); Jerry Douglas Young, Cincinnati, OH (US)

(73) Assignee: The J.M. Smucker Company, Orrville, OH (US)

( * ) Notice: Subject to any disclaimer, the term of this patent is extended or adjusted under 35 U.S.C. 154(b) by 351 days.

This patent is subject to a terminal disclaimer.

(21) Appl. No.: 11/132,819

(22) Filed: May 19, 2005

(65) Prior Publication Data

US 2005/0214433 A1   Sep. 29, 2005

Related U.S. Application Data

(62) Division of application No. 10/077,325, filed on Feb. 15, 2002, now abandoned.

(60) Provisional application No. 60/269,066, filed on Feb. 15, 2001.

(51) Int. Cl.
A23F 5/00 (2006.01)

(52) U.S. Cl. ..................... 426/594; 426/442; 426/330.3

(58) Field of Classification Search ................ 426/594, 426/442, 330.3
See application file for complete search history.

(56) References Cited

U.S. PATENT DOCUMENTS

| 1,822,227 | A | 9/1931 | Lendrich et al. |
|---|---|---|---|
| 2,553,467 | A | 5/1951 | Neef |
| 2,853,387 | A | 9/1958 | Nutting |
| 3,373,041 | A | 3/1968 | Bloom et al. |
| 3,652,292 | A | 3/1972 | Bach et al. |
| 3,753,726 | A | 8/1973 | Clinton et al. |
| 4,540,591 | A | 9/1985 | Dan et al. |
| 4,857,351 | A | 8/1989 | Neilson et al. |
| 4,985,271 | A | 1/1991 | Neilson et al. |
| 5,229,155 | A | 7/1993 | Weisemann et al. |
| 5,332,591 | A | 7/1994 | Ogden |
| 5,384,143 | A | 1/1995 | Koyama et al. |
| 5,401,524 | A | 3/1995 | Burkes et al. |
| 5,853,787 | A | 12/1998 | Gurol |
| 5,993,877 | A | 11/1999 | Ohtake |

(Continued)

FOREIGN PATENT DOCUMENTS

CA   2437770   8/2002

(Continued)

OTHER PUBLICATIONS

Hunter, R.S.—"Photoelectric Color Difference Meter", Journal of the Optical Society of America, vol. 48, (1953) pp. 985-995.

(Continued)

*Primary Examiner*—Anthony Weier
(74) *Attorney, Agent, or Firm*—Calfee, Halter & Griswold LLP

(57) ABSTRACT

A method for altering a coffee source component profile of a coffee source to mimic a target coffee component profile of a target coffee, wherein the coffee source and the target coffee each comprise multiple taste contributing acids.

24 Claims, 1 Drawing Sheet

U.S. PATENT DOCUMENTS

| | | | |
|---|---|---|---|
| 6,039,996 | A | 3/2000 | Hornack |
| 6,048,567 | A | 4/2000 | Villagran et al. |
| 6,054,162 | A * | 4/2000 | Bradbury et al. ......... 426/330.3 |
| 6,056,989 | A | 5/2000 | Sasagawa et al. |
| 6,102,213 | A | 8/2000 | Gurol |
| 6,177,119 | B1 * | 1/2001 | Zeller et al. ................. 426/594 |
| 6,207,203 | B1 | 3/2001 | Atkinson et al. |
| 6,207,211 | B1 | 3/2001 | Wasserman et al. |
| 6,399,131 | B2 | 6/2002 | Zeller et al. |
| 6,544,579 | B1 | 4/2003 | Zeller et al. |
| 6,669,979 | B1 | 12/2003 | Zhao et al. |
| 2002/0155210 | A1 | 10/2002 | Hardesty et al. |
| 2002/0187241 | A1 | 12/2002 | Young et al. |
| 2005/0163907 | A1 | 7/2005 | Young et al. |

FOREIGN PATENT DOCUMENTS

| | | |
|---|---|---|
| CH | 263967 | 12/1949 |
| CN | 1047069 | 12/1999 |
| DE | 37 10 768 A1 | 10/1988 |
| DE | 41 03 209 C1 | 12/1992 |
| DE | 4434400 | 3/1996 |
| DE | 19700368 | 9/1998 |
| EP | 0 282 762 | 3/1987 |
| EP | 0 282 345 A2 | 9/1988 |
| EP | 0 861 596 A1 | 9/1998 |
| GB | 879325 | 10/1961 |
| JP | 44-016343 | 7/1969 |
| JP | 59-1375 | 1/1984 |
| JP | 59-91845 | 5/1984 |
| JP | 64-047344 | 2/1989 |
| JP | 3-133368 | 6/1991 |
| JP | 10042824 A | 2/1998 |
| JP | 10-215771 | 8/1998 |
| JP | 11-32680 | 2/1999 |
| JP | 11-225673 | 8/1999 |
| JP | 2000-300180 | 10/2000 |
| JP | 2000-342182 | 12/2000 |
| RU | 2099979 | 12/1997 |
| WO | WO 92/03061 | 3/1992 |
| WO | WO 95/17826 A1 | 7/1995 |
| WO | WO 97/23139 A1 | 7/1997 |
| WO | WO 98/27818 A1 | 7/1998 |
| WO | WO 99/62345 A1 | 12/1999 |
| WO | WO 00/04789 A1 | 2/2000 |
| WO | WO 00/27226 A1 | 7/2000 |
| WO | 02/063971 | 8/2002 |
| WO | 02/063972 | 8/2002 |

OTHER PUBLICATIONS

Harris, Daniel C.—"Quantitative Chemical Analysis", 4$^{th}$ Edition, W.H. Freeman and Company, 1995, pp. 217-270.
Scholz, Barbara M.; Maier, Hans Gerhard; "Isomers of Quinic Acid and Quinide in Roasted Coffee"; Z Lebensm Unters Forsch (1990), pp. 132-134.
Clifford, Michael, Ph.D.; "What Factors Determine the Intensity of Coffee's Sensory Attributes?"; Tea & Coffee Trade Journal; vol. 159, Sep. 1987, pp. 34-36.
Clarke, R.; "Carboxylic Acids", Coffee- vol. 1 Chemistry; Elsevier Applied Science Publishers; 1985, p. 271-281.
Office Action issued Oct. 15, 2008, for Canadian Patent Application No. 2,437,770.
Response and Amendment submitted Apr. 15, 2009, in response to Office Action issued Oct. 15, 2009, for Canadian Patent Application No. 2,437,770.
Office Action issued Oct. 16, 2009, for Canadian Patent Application No. 2,437,829.
Response and Amendment submitted Apr. 16, 2009, in response to Office Action issued Oct. 16, 2009, for Canadian Patent Application No. 2,437,829.
Office action from Canadian Application No. 2,437,829 dated Nov. 6, 2009.
Office action from Canadian Application No. 2,437,770 dated Nov. 18, 2009.
Related U.S. Appl. No. 10/074,851 filed Feb. 13, 2002.
Related U.S. Appl. No. 10/074,822 filed Feb. 13, 2002.
Related U.S. Appl. No. 10/077,325 filed Feb. 15, 2002.
Related U.S. Appl. No. 10/074,850 filed Feb. 13, 2002.
International Search Report from PCT/US02/04471 dated Sep. 23, 2002.
International Preliminary Examination Report from PCT/US02/04471 dated Dec. 13, 2002.
International Search Report from PCT/US02/05223 dated Oct. 9, 2002.
International Preliminary Examination Report from PCT/US02/05223 dated Jan. 8, 2003.
Notice of Abandonment from U.S. Appl. No. 10/074,850 dated Sep. 30, 2005.
U.S. Patent Office communication from U.S. Appl. No. 10/074,850 dated Feb. 23, 2005.
Amendment from U.S. Appl. No. 10/074,850 dated Nov. 26, 2004.
Office action from U.S. Appl. No. 10/074,850 dated Jul. 1, 2004.
Office action from U.S. Appl. No. 10/077,325 dated Jul. 1, 2004.
Amendment from U.S. Appl. No. 10/077,325 dated Nov. 23, 2004.
Office action from U.S. Appl. No. 10/077,325 dated Feb. 3, 2005.
Examiner Interview Summary and Notice of Abandonment from U.S. Appl. No. 10/077,325 dated Aug. 12, 1005.
Notice of Allowance from U.S. Appl. No. 11/087,757 dated Jun. 15, 2009.
Amendment from U.S. Appl. No. 11/087,757 dated Apr. 2, 2009.
Office action from U.S. Appl. No. 11/087,757 dated Oct. 2, 2008.
Amendment from U.S. Appl. No. 11/087,757 dated Aug. 18, 2008.
Office action from U.S. Appl. No. 11/087,757 dated Apr. 17, 2008.
Amendment from U.S. Appl. No. 11/087,757 dated Feb. 1, 2008.
Office action from U.S. Appl. No. 11/087,757 dated Nov. 15, 2007.
Office action from CA Application No. 2,437,770 dated Jul. 16, 2007.
Response from CA Application No. 2,437,770 dated Jan. 16, 2008.
Office action from Canadian Application No. 2,437,829 dated Jul. 23, 2007.
Response to Office action from Canadian Application No. 2,437,829 dated Jan. 18, 2008.
Communication from European Application No. 02709630.4 dated Nov. 11, 2004.
Response to Communication from European Application No. 02709630.4 dated May 19, 2005.
Communication from European Application No. 02709630.4 dated Jul. 25, 2005.
Response to Communication from European Application No. 02709630.4 dated Mar. 22, 2006.
Communication from European Application No. 02713599.5 dated Nov. 12, 2004.
Response to Communication from European Application No. 02713599.5 dated Jun. 7, 2005.
Notice of Allowance from U.S. Appl. No. 11/087,757 dated Oct. 7, 2009.
Communication from European Application No. 02713599.5 dated Jul. 25, 2005.
Response to Communication from European Application No. 02713599.5 dated Mar. 22, 2006.
Communication from European Application No. 02713599.5 dated Aug. 1, 2006.
Communication from European Application No. 02713599.5 dated Nov. 29, 2006.
Response to Communication from European Application No. 02713599.5 dated Nov. 28, 2006.
Office action from Japanese Application No. 2002-563779 dated Jun. 10, 2008.
Outline of Response to Jun. 10, 2008 Office action in Japanese Application No. 2002-563779 filed Sep. 10, 2008.
Office action from Japanese Application No. 2002-563779 dated May 1, 2009.
Griffin et al., "Determination of the relationship between phosphate concentration and perceived acidity in coffee", Dept of Chemistry, Davidson College, http://www.coffeeresearch.org/research/phosphate1.pdf, Mar. 14, 2003 using Internet Archive WayBack Machine.

* cited by examiner

METHOD OF MAKING COFFEE COMPOSITIONS WITH STABLE FLAVOR CHARACTERISTICS

CROSS REFERENCE TO RELATED APPLICATIONS

This application is a Divisional of U.S. application Ser. No. 10/077,325, filed Feb. 15, 2002, now abandoned which claims priority to U.S. Provisional Application No. 60/269,066, filed Feb. 15, 2001.

FIELD OF THE INVENTION

The present invention relates to novel coffee compositions with enhanced flavor characteristics. In particular, the present invention relates to novel processes for preparing enhanced coffee compositions and the products comprising them.

BACKGROUND OF THE INVENTION

High quality coffee food and beverage products enjoy considerable popularity and make up an increasingly significant proportion of the diets of many people. However, high quality flavored coffee products are both expensive to purchase and to produce. One such reason is the cost of the flavoring materials. To produce high quality, flavored coffee products with realistic flavors has previously required the use of non-artificial flavorants (e.g., 100% real juice). However, real ingredients are expensive, and frequently hard to obtain in the quantities required. This results in higher production costs for high quality flavored coffee products that must eventually be borne by the consumer.

One such approach to this problem has been the use of artificial flavoring agents comprising a portion of the ingredients that can be found in real flavoring agents. The flavoring compositions, however, suffer from poor consumer acceptance because of an inability to reproduce natural flavor characteristics.

Additionally, as the popularity of more exotic flavor combinations for coffee flavored beverages increases there exists a need to satisfactorily mitigate the consumer dispreferred interactions between the characteristic flavors of the beverage ingredients.

Considerable effort, therefore, has been expended in an attempt to address the need for coffee beverages with enhanced flavors. Accordingly, it is an object of the present invention to provide compositions and methods which address these needs and provide further related advantages.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE INVENTION

Figure 1:
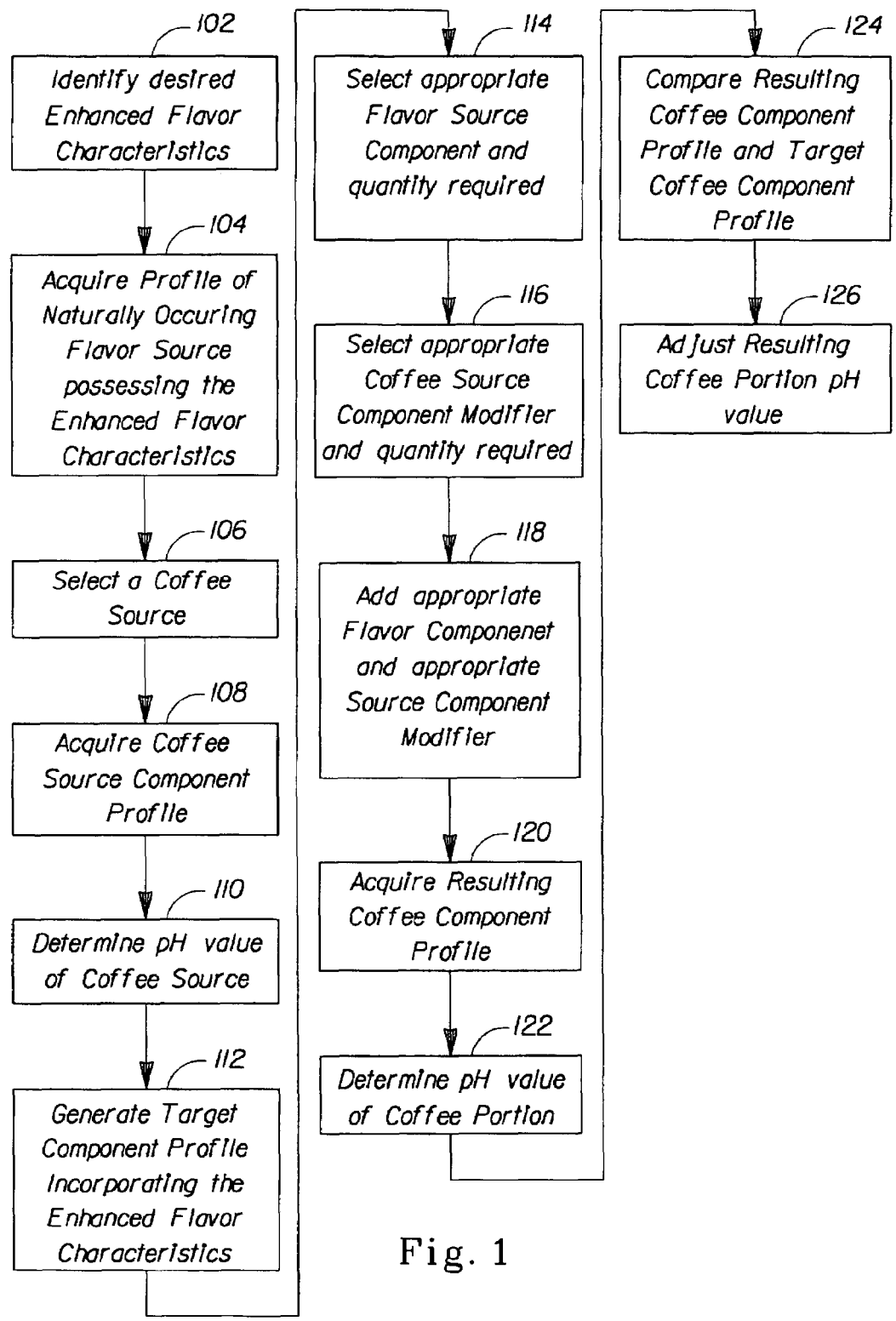
FIG. 1 Is a flow diagram describing the process steps of the present invention.

The present invention relates to novel coffee compositions with specific flavor characteristics. In particular, the present invention relates to novel processes for preparing flavored coffee compositions and the products comprising them.

A. Definitions

As used herein, the term "flavor source" is defined as a compound or a combination of compounds capable of imparting the characteristic flavor note or notes associated with nuts, berries, dairy flavor contributing products (e.g., milk, cream, half-and-half, artificial creamer, butter, custard, and the like), cocoa, vanilla, alcohols and liqueur flavor contributing products (e.g., Irish cream, amaretto, grand marnier, Kahlua, and the like), caramel, mint, coffees, chocolates, and cinnamon. The flavor source may be either a single flavor source, or a combination of two or more flavor sources. Also the flavor source may be either naturally occurring, artificial (e.g., an artificial flavoring available from one of many commercial flavoring house), or a combination of the two.

As used herein, the term "naturally occurring flavor source" is defined as a compound or series of compounds typically found in such products as extracts, pressings, purees, or other aqueous forms of a flavor source. The naturally occurring flavor source comprises the aldehydes, ketones, lactones, carbohydrates, acids, proteins and other compounds commonly found in the flavor source. Milk, cream, half-and-half, fresh squeezed fruit and vegetable juices (e.g., orange, lime, lemon, grapefruit, apple, cranberry, etc.), and purees of fruits and vegetables are but a few examples of naturally occurring flavor sources.

As used herein, the term "artificially occurring flavor source" is defined as a compound or combination of compounds intended to provide at least a portion, if not all, of the characteristic flavor impact of an associated flavor source. The artificially occurring flavor source may be an isolate or other sub set of compounds found in a flavor source, or may be one or more compounds that exhibit a characteristically similar sensory perception (e.g., taste, olfactory) to one or more compounds found in a flavor source. The artificially occurring flavor source is typically a compilation of the aldehydes, ketones, lactones, and carbohydrates of the flavor source, though is not limited to just those categories of compounds.

As used herein, the term "flavor source component" is defined as one of the taste contributing acids contained within a flavor source. One skilled in the art will appreciate that by the term acid it is meant the combination of the acid's associated and dissociated forms. The flavor source component can exist in one or more forms selected from the following group: acidic form of the taste contributing acid, anionic form of the taste contributing acid, and metallic and ammonium salt of the taste contributing acid.

As used herein, the term "flavor source component profile" is defined as the concentration of one or more flavor source components present within a given flavor source. The flavor source component profile can be represented by a graph, a table, or some other suitable visual representation showing the existence and concentrations of flavor source components.

As used herein, the term "enhanced flavor source" is defined as an artificially occurring flavor source that has been supplemented with at least a portion of the flavor source component profile of a corresponding flavor source. For example, an artificial raspberry flavor that has been supplemented with one or more of the relevant taste contributing acids present in a naturally occurring raspberry flavor source.

As used herein, the term "coffee source" is defined as a beverage source derived from a plant of the Family Rubiaceae, Genus *Coffea*, from a given region of origin. One skilled in the art will appreciate that by region of origin it is meant a coffee growing region wherein the coffee growing process utilizes identical coffee seedlings. Additionally, a region of origin experiences similar soil conditions, fertilization conditions, growing environment (e.g., rainfall amount, temperature, altitude, sunlight), and pre-roasting process, handling, and storage conditions.

There are many coffee species, however, it is generally recognized by those skilled in the art that there are two primary commercial coffee species, *Coffea arabica* and *Coffea canephora* var. *robusta*. Coffees from the Species *arabica* are described as "Brazils," which come from Brazil, or "Other Milds" which are grown in other premium coffee producing countries. Premium *arabica* countries are generally recognized as including Colombia, Guatemala, Sumatra, Indonesia, Costa Rica, Mexico, United States (Hawaii), El Salvador, Peru, Kenya, Ethiopia and Jamaica. Coffees from the Species *canephora* var. *robusta* are typically used as a low cost extender for *arabica* coffees. These *robusta* coffees are typically grown in the lower regions of West and Central Africa, India, South East Asia, Indonesia, and Brazil.

The coffee source can be in a variety of forms including, but not limited to, cherries, beans, leaves, and bark. Additionally, the coffee source can take the form of soluble coffee, roast and ground, roasted whole bean, green coffee, and extracts of coffee via aqueous, super-critical fluid, and organic solvent extraction processes. The coffee source can also be caffeinated, decaffeinated, or a blend of both.

As used herein, the term "coffee source component" is defined as one of the taste contributing acids contained within the coffee source. One skilled in the art will appreciate that by the term acid it is meant the combination of the acid's associated and dissociated forms. The coffee source component is generated or formed as a result of coffee source growing, harvesting, processing, roasting, fermentation, preparation, handling and/or storage processes.

As used herein, the term "taste contributing" is defined as an acid contained within the coffee source whose concentration is perceptible by taste at a concentration in water that is identical to the concentration of the acid in the target coffee and is directly or inversely correlated to roasting conditions, or whose concentration varies with coffee region of origin, or whose concentration varies with coffee species. Perceptible by taste is defined as modifying the sensory perception of one or more of the flavor characteristics associated with a taste contributing acid. Examples of flavor characteristics normally associated with acids include, but are not limited to, sweet, sour, salty, bitter, soury, winey, acidy, mellow, bland, sharp, harsh, pungent, and the like.

As used herein, the term "coffee source component profile" is defined as the concentration of coffee source components present within a coffee source. The coffee source component profile can be represented by a graph, a table, or some other suitable visual representation showing the existence and concentrations of coffee source components.

As used herein, the term "supplemental source component" is defined as a taste contributing acid. The taste contributing acid of the supplemental source component corresponds to the taste contributing acid of a source component (e.g., flavor source components of naturally occurring, artificially occurring, or enhanced flavor sources; coffee source components, supplemental coffee source components resulting source components), though it may exist in the same or a different form of the acid. The supplemental source component can exist in one or more forms selected from the following group: acidic form of the taste contributing acid, anionic form of the taste contributing acid, and metallic and ammonium salt of the taste contributing acid.

As used herein, the term "source component modifier" is defined as a compound, or set of compounds, that adjusts the perceptible concentration of one or more source components (e.g., flavor source components of naturally occurring, artificially occurring, or enhanced flavor sources; coffee source components, supplemental coffee source components resulting source components). Acceptable source component modifiers include one or more of the following sodium, magnesium, potassium, hydrogen, calcium, and ammonium cations, in combination with hydroxide, carbonate, bicarbonate, gluconate, and sulfates.

The addition of a source component modifier will modify the taste perceptible concentration of one or more source components. The addition of a source component modifier is also used to adjust the pH value of the coffee portion of a coffee beverage or composition to within an acceptable range of the pH values of the coffee portion of a target coffee composition or beverage.

As used herein the term "resulting source component" is defined as the combination of a source component and a corresponding supplemental source component. It will be appreciated by one skilled in the art upon reading the disclosure herein that depending on the particular flavor characteristic or characteristics to be added, augmented, reduced, or removed the concentration of either the source component, the supplemental source component, or both may be zero.

As used herein the term "resulting source component profile" is defined as the concentration of one or more resulting source components present within a formulated beverage or beverage composition. The resulting source component profile can be represented by a graph, a table, or some other suitable visual representation showing the existence and concentrations of resulting source components.

As used herein, the term "target coffee" is defined as a coffee beverage or coffee composition incorporating the desired enhanced flavor characteristics of the flavor source. The target coffee comprises a coffee element that is generally derived from a bean or a blend of beans from a plant of the Family Rubiaceae, Genus *Coffea*, from a given region of origin. However, the coffee element of the target coffee can also be derived from a variety of coffee materials including, but not limited to, cherries, beans, leaves, and bark. Additionally, the coffee element of the target coffee can take the form of soluble coffee, roast and ground, roasted whole bean, green coffee, and extracts of coffee via aqueous, super-critical fluid, and organic solvent extraction processes. The coffee element can also be caffeinated, decaffeinated, or a blend of both. The target coffee may optionally further comprise one or more characteristic flavor attributes associated with one or more given flavor sources. By way of example, and not intending to be limited to these beverages set forth, the target coffee may be a berry flavored coffee, a flavored latte beverage, or a creamy coffee beverage.

As used herein, the term "target coffee component" is defined as one of the taste contributing acids contained within the target coffee. One skilled in the art will appreciate that by the term acid it is meant the combination of an acid's associated and disassociated forms.

As used herein, the term "target coffee component profile" is defined as the concentration of target coffee components present within the target coffee. The target coffee component profile can be represented by a graph, a table, or some other suitable visual representation showing the existence and concentrations of target coffee components.

B. Coffee Source

It has been determined according to the present invention that coffee beverages and compositions that exhibit consumer preferred flavor characteristics may be produced from a variety of coffee sources. The preferred coffee source for a particular use may vary according to considerations of availability, expense, and flavor associated with the coffee source. Additionally, the degree and nature of impurities and other components in the coffee source may be considered. A coffee beverage composition may also be produced from a blend of one or more suitable coffee sources.

The coffee beverages and compositions of the present invention comprise a coffee portion, and may optionally contain additional components, such as foaming agents, mouthfeel enhancing agents, flavorants, creamy components, inert fillers and carriers, sweetening agents, and the like. The coffee portion is comprised of a coffee source, and any supplemental coffee source component and/or coffee source component modifier required.

Coffee sources exist in a variety of forms including, but not limited to, cherries, leaves, bark, soluble coffee, instant coffee, roast and ground, roasted whole bean, green coffee beans, extracts including aqueous, super-critical fluid, and organic solvents, and mixtures thereof. Furthermore, the coffee source can be caffeinated, decaffeinated, or a blend of both. It is recognized that coffee sources suitable for use in the present invention may contain various impurities and/or by-products.

Coffee sources of the present invention are defined by coffee variety (i.e., coffee species and region of origin). By region of origin it is meant a coffee growing region wherein the coffee growing process utilizes identical coffee seedlings. Additionally, a region of origin experiences similar soil conditions, fertilization conditions, growing environment (e.g., rainfall amount, temperature, altitude, sunlight), and pre-roasting process, handling, and storage conditions. The species, region of origin, and coffee growing, harvesting, processing, roasting, fermentation, preparation, handling and/or storage process conditions determine the presence and concentration of a given acid in a coffee source.

It has been found that the coffee sources of the present invention contain one or more of the following acids: Formic, Acetic, Propanoic, Butanoic, Pentanoic, Hexanoic, Heptanoic, Octanoic, Nonanoic, Decanoic, Palmitic, Crotonic, Isocrotonic, Hydroxyacetic, Isobutyric, Lactic, 3-hydroxypropanoic, Glyceric, 2,3-dihydroxypropanoic, 2-(4-methoxyphenoxy) propanoic, 2-hydroxybutyric, 2,4-dihydroxybutyric, 2-methylbutanoic, Isovaleric, Methacrylic, Tiglic, Angelic, 3-methyl-2-butenoic, Pyruvic, 2-Oxobutyric, 3-oxobutanoic, Levulinic, Oxalic, Malonic, Succinic, Glutaric, Fumaric, Maleic, Methylsuccinic, Malic, Tartaric, 2-hydroxyglutaric, Ketoglutaric, Citraconic, Mesaconic, Itaconic, Citric, Aspartic, Glutamic, Pyroglutamic, Nicotinic, 2-Furoic, Benzoic, 3-hydroxybenzoic, 4-hydroxybenzoic, 2,5-dihydroxybenzoic, 3,4-dihydroxybenzoic, 3,4,5-Trihydroxybenzoic, 1,2,4-trihydroxybenzoic, Vanillic, Phytic, Phosphoric, Quinic, Caffeic, Ferulic, 3-(4-Hydroxy-3-methoxyphenyl)-2-propenoic, p-coumaric, o-coumaric, 4-methoxycinnamic, 3,4-dimethoxycinnamic, 3,4,5-trimethoxycinnamic, 3-caffeoylquinic, 4-caffeoylquinic, 5-caffeoylquinic, 3-feruloylquinic, 4-feruloylquinic, 5-feruloylquinic, 3,4-dicaffeoylqunic, 3,5-dicaffeoylqunic, 4,5-dicaffeoylqunic, p-coumaroylquinic, caffeoylferuoylqunic. The exact concentration within a given coffee source depends on the coffee species selected, the growing and harvesting conditions, and the coffee source preparation processes described above.

Coffee sources have been found to contain varying levels of acids depending on its form. For example, green coffee has been found to contain approximately 11% total acid by weight, Roasted coffee has been found to contain approximately 6% total acid content by weight, and instant coffee has been found to contain approximately 16% total acid content by weight.

C. Coffee Source Component

A coffee source component is defined as a taste contributing acid present within a given coffee source. As used herein, the term "taste contributing" is defined as an acid contained within the coffee source whose concentration is perceptible by taste at a concentration in water that is identical to the concentration of the acid in the target coffee and is directly or inversely correlated to roasting conditions, or whose concentration varies with coffee region of origin, or whose concentration varies with coffee species. Perceptible by taste is defined as modifying the sensory perception of one or more of the flavor characteristics associated with a taste contributing acid. Examples of flavor characteristics normally associated with acids include, but are not limited to, sweet, sour, salty, bitter, soury, winey, acidy, mellow, bland, sharp, harsh, pungent, and the like. In addition, a taste contributing acid is an acid whose concentration exhibits at least one of the following phenomenon: a roast effect; a coffee species effect; and a coffee region of origin effect.

As used herein the term roast effect is defined as the existence of a relationship between the concentration of the acid in a roasted coffee source and the roasting conditions selected. One skilled in the art will appreciate that roasting conditions are generally recognized as time, heat input and moisture. One skilled the art will also appreciate that the roasting conditions selected for a given coffee source can be characterized by roast time, roasting equipment, and a Hunter $L^*$ color. As used herein, color differences are defined in terms of readings measured on a Hunter calorimeter and specifically the values $L^*$, $a^*$ and $b^*$ derived from the Hunter CIE scale. See pages 985-95 of R. S. Hunter, "Photoelectric Color Difference Meter," *J. of the Optical Soc. of Amer.*, Volume 48, (1958), herein incorporated by reference.

As used herein, the term coffee species effect is defined as an acid having a concentration in a coffee source of one coffee species, subjected to a given set of growing, harvesting, and processing conditions, that is different from the concentration in a different coffee species, subjected to identical growing, harvesting, and processing conditions. As used herein, the term coffee region of origin effect is defined as an acid having a concentration that is dependent on the coffee growing, harvesting, processing, roasting, fermentation, preparation, handling and/or storage processes.

The presence of a given coffee source component, and its corresponding concentration within a coffee source, is a function of many factors. The factors vary depending on the specific coffee source selected. Most notable among these, however, is the selection of a specific coffee species. Additionally, growing conditions such as rainfall amounts, temperature, fertilization, harvesting, handling, and storage of the coffee species contribute greatly to the presence and concentration of a given coffee source component. Moreover, subsequent processing and preparation of the coffee species may significantly impact coffee source component concentrations.

The coffee source component can exist within a coffee source in a variety of forms. Typically the coffee source component is present in the acidic form of the taste contributing acid. As an acid, the coffee source component exists in both the associated and disassociated forms of the acid. However, it has been found that in the present invention suitable coffee source components may also exist as a salt of the taste contributing acid.

D. Coffee Source Component Profile

A Coffee source component profile is defined as the concentration of coffee source components present within a given coffee source. The coffee source component profile represents the coffee source component concentration at a pH value of 14, in the completely dissociated form of the acid. The coffee source component profile can take the form of a graph, a table, or some other suitable visual representation showing the existence and concentrations of beverage source components.

Table 1 is a tabular representation of the coffee source component profile of a roast and ground coffee source (Vietnam *robusta*, roasted for 854 seconds on a Thermalo batch roaster, to a Hunter L-color of 17.68). FIG. 1 is a graphical representation of the same coffee source component profile.

TABLE 1

Vietnam robusta, roasted for 854 seconds on a Thermalo batch roaster to a Hunter L-color of 17.68

| Coffee Source Component (Anionic Form) | Concentration (ppm) |
| --- | --- |
| Quinate | 79 |
| Lactate | 30 |
| Acetate | 119 |
| Formate | 45 |
| Malate | 24 |
| Fumarate | 27 |
| Phosphate | 77 |
| Citrate | 85 |

E. Target Coffee, Target Coffee Component, and Target Coffee Component Profile As used herein, the term "target coffee" is defined as a coffee beverage or coffee composition incorporating the desired enhanced flavor characteristics of the flavor source. The target coffees of the present invention may optionally further comprise one or more characteristic flavor attributes associated with one or more given flavor sources. By way of example, and not intending to be limited to these beverages set forth, the target coffee may be a berry flavored coffee, a flavored latte beverage, or a creamy coffee beverage. The target coffees of the present invention may optionally contain additional elements, such as foaming agents, mouthfeel enhancing agents, flavorants, creamy components, inert fillers and carriers, sweetening agents, and the like.

The coffee element of the target coffee is derived from a plant of the Family Rubiaceae, Genus *Coffea*, from a given region of origin. The coffee element of the target coffee can be in a variety of forms including, but not limited to, cherries, beans, leaves, and bark. Additionally, the coffee element can take the form of soluble coffee, roast and ground, roasted whole bean, green coffee, and extracts of coffee via aqueous, super-critical fluid, and organic solvent extraction processes. The coffee element can also be caffeinated, decaffeinated, or a blend of both.

It has been found that the coffee element of the target coffee contains one or more of the following acids: Formic, Acetic, Propanoic, Butanoic, Pentanoic, Hexanoic, Heptanoic, Octanoic, Nonanoic, Decanoic, Palmitic, Crotonic, Isocrotonic, Hydroxyacetic, Isobutyric, Lactic, 3-hydroxypropanoic, Glyceric, 2,3-dihydroxypropanoic, 2-(4-methoxyphenoxy) propanoic, 2-hydroxybutyric, 2,4-dihydroxybutyric, 2-methylbutanoic, Isovaleric, Methacrylic, Tiglic, Angelic, 3-methyl-2-butenoic, Pyruvic, 2-Oxobutyric, 3-oxobutanoic, Levulinic, Oxalic, Malonic, Succinic, Glutaric, Fumaric, Maleic, Methylsuccinic, Malic, Tartaric, 2-hydroxyglutaric, Ketoglutaric, Citraconic, Mesaconic, Itaconic, Citric, Aspartic, Glutamic, Pyroglutamic, Nicotinic, 2-Furoic, Benzoic, 3-hydroxybenzoic, 4-hydroxybenzoic, 2,5-dihydroxybenzoic, 3,4-dihydroxybenzoic, 3,4,5-Trihydroxybenzoic, 1,2,4-trihydroxybenzoic, Vanillic, Phytic, Phosphoric, Quinic, Caffeic, Ferulic, 3-(4-Hydroxy-3-methoxyphenyl)-2-propenoic, p-coumaric, o-coumaric, 4-methoxycinnamic, 3,4-dimethoxycinnamic, 3,4,5-trimethoxycinnamic, 3-caffeoylquinic, 4-caffeoylquinic, 5-caffeoylquinic, 3-feruloylquinic, 4-feruloylquinic, 5-feruloylquinic, 3,4-dicaffeoylqunic, 3,5-dicaffeoylqunic, 4,5-dicaffeoylqunic, p-coumaroylquinic, caffeoylferuoylqunic. The exact concentration of an given acid within a the coffee element of the target coffee depends on the coffee species selected, the growing and harvesting conditions, and coffee element preparation processes described above.

The target coffee component profile is defined as the concentration of target coffee components present within the coffee element of the target coffee. The target coffee component profile can be represented by a graph, a table, or some other suitable visual representation showing the existence and concentrations of target coffee components.

In one embodiment of the present invention the target coffee comprises eight ounces of a coffee element (Colombian *Arabica*, roasted for 201 seconds on a Thermalo batch roaster, to a Hunter L-color of 12.1) in combination with 0.25 ounces of a puree of frozen raspberries. In another embodiment of the present invention the target coffee comprises ten ounces of a coffee element (Kenya AA (*arabica*), roasted on a Jabez Burns laboratory roaster for 10 minutes, to a Hunter L-color of 18.76) in combination with three ounces of heavy cream.

F. Source Component Modifier

A source component modifier is defined as a compound, or combination of compounds, that adjusts the perceptible concentration of one or more source components. In solution, an acid can exist entirely in an associated form, entirely in a dissociated form, or as a combination of the two. The proportion of a given acid that exists in its associated and dissociated states is, in part, a function of the equilibrium constant for the given acid. It is the associated form of an acid that is responsible for taste. Though not intended to be limited by theory, Applicants believe that the human sensory perception of taste detects the associated form of an acid, the dissociated form of the acid is imperceptible. By adjusting the pH value of a given beverage or composition, the source component modifier adjusts perceptible concentration of a source component. Acceptable source component modifiers include: sodium, magnesium, potassium, hydrogen, calcium, and ammonium cations, in combination with hydroxide, carbonate, bicarbonate, gluconate, and sulfates. Combinations of these compounds are also acceptable.

The source component modifier compounds can exist in a variety of forms. The coffee source component modifier may exist in a solution of water, or some other suitable aqueous medium. Moreover, the source component modifier can exist in non-aqueous solutions (e.g., oil and glycerin). Alternatively, the source component modifier may exist as one or more dry ingredients.

The source component modifier can be combined with a coffee source in a variety of ways, depending on the nature and form of the coffee source and the source component modifier selected and employed. If the coffee source selected were a roast and ground coffee, the source component modifier could exist in an aqueous solution that is sprayed onto, or mixed with, the roast and ground coffee. Alternatively, the source component modifier could exist in a dry state, and be mixed with the roast and ground coffee source in a coffee composition. When the coffee composition is transformed into a coffee beverage, the source component modifier would then act to adjust the perceptible concentration of the coffee source component in the method described.

A source component modifier existing in solution could also be applied (e.g., by spraying or mixing) to a roasted whole bean, green coffee bean, liquid coffee extract, soluble coffee, or other form of a coffee source (e.g., cherries, leaves, and the like). The same is true for a source component modifier existing in a dry state. The source component modifier can exist in any suitable form in an intermediate state of the final, consumable coffee beverage. The form of the source component modifier is only limited by the need to exist in a state capable of adjusting the perceived concentration of a source component, in the final, consumable form of the coffee beverage.

Source component modifiers that are a combination of two or more suitable compounds can be combined with the coffee source together or separately. Additionally, multi-compound source component modifiers can exists in different states (e.g., in solution or a dry state) so long as they are capable of adjusting the perceived concentration of a source component, in the final, consumable form of the coffee beverage.

The source component modifiers of the present invention also need not be applied directly to the coffee source to be effective. The coffee beverages and coffee compositions of the present invention may include additional ingredients, such as foaming agents, mouthfeel enhancing agents, flavorants, creamy components, inert fillers and carriers, sweetening agents, and the like. The source component modifiers may be combined with any of these additional ingredients, in a suitable form, such that they are capable of adjusting the perceived concentration of a source component, in the final, consumable form of the coffee beverage.

G. Supplemental Source Components

A supplemental source component is defined as a taste contributing acid. The taste contributing acid of the supplemental source component corresponds to the taste contributing acid of the coffee and/or flavor source component, though it may exist in the same or a different form of the acid. The supplemental source component can exist, just as the flavor source component can exist, as either the acidic form of the taste contributing acid (e.g., Citric Acid; Malic Acid; Formic Acid; Fumaric Acid; Phosphoric Acid; 2-Furoic Acid; Lactic Acid; Acetic Acid.), or as a salt of the taste contributing acid (e.g., Mono-, Di-, or Tri-Sodium Citrate; Mono-, Di-, or Tri-Potassium Citrate; Mono-, or Di-Sodium Malate; Mono- or Di-Potassium Malate; Sodium Formate; Potassium Formate; Mono- or Di-Sodium Fumarate; Mono- or Di-Potassium Fumarate; Mono- or Di-Sodium Phosphate; Mono- or Di-Potassium Phosphate; Sodium Furoate; Potassium Furoate; Sodium Lactate; Potassium Lactate).

Though the supplemental source component can be any of the taste contributing acids, preferred taste contributing acids are the acids of the following anions: Quinate, Lactate, Acetate, Formate, 2-Furoate, 3-Methyl Malate, Citramalate, Hydroxyglutarate, Glutarate, Malate, Citraconate, Maleate, Mesaconate, Oxalate, Fumarate, Phosphate and Citrate.

The supplemental source components of the present invention can exist in a variety of forms. The supplemental source component may exist in a solution of water, or some other suitable aqueous medium. Moreover, the supplemental source component can exist in non-aqueous solutions (e.g., oil and glycerin). Alternatively, a supplemental source component may exist as one or more dry ingredients.

The supplemental source component can be combined with the coffee source in a variety of ways, depending on the nature and form of the coffee source and the supplemental source component. If the coffee source selected were a roast and ground coffee, the supplemental source component could exist in an aqueous solution that is sprayed onto, or mixed with, the roast and ground coffee. Alternatively, the supplemental source component could exist in a dry state, and be mixed with the roast and ground coffee source in a coffee composition. When the coffee composition is transformed into a coffee beverage, the supplemental source component would then act to supplement the total concentration of the corresponding coffee source component in the method described.

A supplemental source component existing in solution could also be applied (e.g., by spraying or mixing) to a roasted whole bean, green coffee bean, liquid coffee extract, soluble coffee, or other form of a coffee source (e.g., cherries, leaves, and the like). The same is true for a supplemental source component existing as a dry ingredient. The supplemental source component can exist in any suitable form, in an intermediate state of the final, consumable coffee beverage. The exact form of the supplemental source component is only limited by the need to exist in a state capable of supplementing the total concentration of the corresponding source component, in the final, consumable form of the coffee beverage.

Supplemental source components that are a combination of two or more suitable compounds can be combined with the coffee source together or separately. Additionally, multi-compound supplemental source components can exists in different states (e.g., in solution or a dry state) so long as they are capable of supplementing the total concentration of the corresponding source component, in the final, consumable form of the coffee beverage.

The supplemental source components of the present invention also need not be combined with the coffee source directly to be effective. The coffee beverages and coffee compositions of the present invention may include additional ingredients, such as foaming agents, mouthfeel enhancing agents, flavorants, creamy components, inert fillers and carriers, sweetening agents, and the like. The supplemental source components may be combined with any of these additional ingredients, in any suitable form, such that they are capable of supplementing the total concentration of the corresponding source component, in the final, consumable form of the coffee beverage.

H. Resulting Coffee Source, Resulting Coffee Component, Resulting Coffee Component Profile As used herein the term "resulting source component" is defined as the combination of a source component and a corresponding supplemental source component. As used herein the term "resulting component profile" is defined as the concentration of one or more resulting source components present within a formulated beverage or composition. The resulting source component profile can be represented by a graph, a table, or some other suitable visual representation showing the existence and concentrations of resulting source components.

I. Flavor Source Component

A flavor source component is defined as a taste contributing acid. The taste contributing acid of the flavor source component corresponds to the taste contributing acid of the flavor source, though it may exist in the same or a different form of the acid. The flavor source component can exist as either the acidic form of the taste contributing acid (e.g., Citric Acid; Malic Acid; Formic Acid; Fumaric Acid; Phosphoric Acid; 2-Furoic Acid; Lactic Acid; Acetic Acid.), or as a salt of the taste contributing acid (e.g., Mono-, Di-, or Tri-Sodium Citrate; Mono-, Di-, or Tri-Potassium Citrate; Mono-, or Di-Sodium Malate; Mono- or Di-Potassium Malate; Sodium Formate; Potassium Formate; Mono- or Di-Sodium Fumarate; Mono- or Di-Potassium Fumarate; Mono- or Di-Sodium Phosphate; Mono- or Di-Potassium Phosphate; Sodium Furoate; Potassium Furoate; Sodium Lactate; Potassium Lactate).

Though the flavor source component can be any of the taste contributing acids, preferred taste contributing acids include: Formic, Acetic, Propanoic, Butanoic, Pentanoic, Hexanoic, Heptanoic, Octanoic, Nonanoic, Decanoic, Palmitic, Crotonic, Isocrotonic, Hydroxyacetic, Isobutyric, Lactic, 3-hydroxypropanoic, Glyceric, 2,3-dihydroxypropanoic, 2-(4-methoxyphenoxy)propanoic, 2-hydroxybutyric, 2,4-dihydroxybutyric, 2-methylbutanoic, Isovaleric, Methacrylic, Tiglic, Angelic, 3-methyl-2-butenoic, Pyruvic, 2-Oxobutyric, 3-oxobutanoic, Levulinic, Oxalic, Malonic, Succinic, Glutaric, Fumaric, Maleic, Methylsuccinic, Malic, Tartaric, 2-hydroxyglutaric, Ketoglutaric, Citraconic, Mesaconic, Itaconic, Citric, Aspartic, Glutamic, Pyroglutamic, Nicotinic, 2-Furoic, Benzoic, 3-hydroxybenzoic, 4-hydroxybenzoic, 2,5-dihydroxybenzoic, 3,4-dihydroxybenzoic, 3,4,5-Trihydroxybenzoic, 1,2,4-trihydroxybenzoic, Vanillic, Phytic, Phosphoric, Quinic, Caffeic, Ferulic, 3-(4-Hydroxy-3-methoxyphenyl)-2-propenoic, p-coumaric, o-coumaric, 4-methoxycinnamic, 3,4-dimethoxycinnamic, 3,4,5-trimethoxycinnamic, 3-caffeoylquinic, 4-caffeoylquinic, 5-caffeoylquinic, 3-feruloylquinic, 4-feruloylquinic, 5-feruloylquinic, 3,4-dicaffeoylqunic, 3,5-dicaffeoylqunic, 4,5-dicaffeoylqunic, p-coumaroylquinic, caffeoylferuoylqunic, Aconitic, Adipic, Ascorbic, Citronellic, Cyclohexane-acetic, 2-Ethyl Butyric, 3-Hexenoic, 2-Methylhexanoic, 5-Methylhexanoic, 3-Methylpentanoic, 4-Methylpentanoic, 2-Methyl-4 Pentenoic, 2-MethylValeric, Myristic, 4-Pentenoic, Phenyl-acetic, 3-Phenylpropionic, Tannic, Thiolactic, Aconitic Acid, Adipic Acid, Ascorbic Acid, L-Aspartic Acid, Benzoic Acid, Butyric Acid, Cinnamic Acid, Citronellic Acid, CyclohexaneAcetic Acid, Cyclohexane Carboxylic Acid, Decanoic Acid, 2-Ethyl Butyric Acid, L-Glutamic Acid, Heptanoic Acid, Hexanoic Acid, 3-Hexenoic Acid, Isovaleric Acid, Levulinic Acid, 2-Methylhexanoic Acid, 5-Methylhexanoic Acid, 3-Methylpentanoic Acid, 4-Methylpentanoic Acid, 2-Methyl-4 Pentenoic Acid, 2-MethylValeric Acid, Myristic Acid, Octanoic Acid, 2-Oxobutyric Acid, 4-Pentenoic Acid, Phenylacetic Acid, 3-Phenylpropionic Acid, Propionic Acid, Pyruvic Acid, Tannic Acid, Tartaric Acid, Thiolactic Acid, Valeric Acid.

The flavor source components of the present invention can exist in a variety of forms. The flavor source component may exist in a solution of water, or some other suitable aqueous medium. Moreover, the flavor source component can exist in non-aqueous solutions (e.g., oil and glycerin). Alternatively, flavor source component may exist as one or more dry ingredients.

The flavor source component can be combined with the coffee source in a variety of ways, depending on the nature and form of the coffee source and the flavor source component. If the coffee source selected were a roast and ground coffee, the flavor source component could exist in an aqueous solution that is sprayed onto, or mixed with, the roast and ground coffee. Alternatively, the flavor source component could exist in a dry state, and be mixed with the roast and ground coffee source in a coffee composition. When the coffee composition is transformed into a coffee beverage, the flavor source component would then act to supplement the total concentration of the corresponding coffee source component in the method described.

A flavor source component existing in solution could also be applied (e.g., by spraying or mixing) to a roasted whole bean, green coffee bean, liquid coffee extract, soluble coffee, or other form of a coffee source (e.g., cherries, leaves, and the like). The same is true for a flavor source component existing as a dry ingredient. The flavor source component may also exist in a suitable form in an intermediate state of the final, consumable coffee beverage. The exact form of the flavor source component is only limited by the need to exist in a state capable of providing the enhanced flavor characteristic(s) in the final, consumable form of the coffee beverage.

Flavor source components that are a combination of two or more suitable compounds can be combined with the coffee source together or separately. Additionally, multi-compound flavor source components can exists in different states (e.g., in solution or a dry state) so long as they are capable of providing the enhanced flavor characteristic(s) in the final, consumable form of the coffee beverage.

The flavor source components of the present invention also need not be combined with the coffee source directly to be effective. The coffee beverages and coffee compositions of the present invention may include additional ingredients, such as foaming agents, mouthfeel enhancing agents, flavorants, creamy components, inert fillers and carriers, sweetening agents, and the like. The flavor source components may be combined with any of these additional ingredients, in a suitable form, such that they are capable of providing the enhanced flavor characteristic(s) in the final, consumable form of the coffee beverage.

The flavor source components of the present invention may alternatively be combined with the artificially occurring flavor source prior to addition to the coffee source, so long as the flavor source components are capable of providing the enhanced flavor characteristic(s) in the final, consumable form of the coffee beverage.

J. Perceptibility of Acids

The Applicants have observed that the individual acids found in coffee each have an associated flavor note. It has also been observed by Applicants that specific combinations of these acids exhibit characteristic flavors based on the specific combination of acids and their associated flavor notes. Though the ability to perceive the associated flavor note for a given acid in solution by the sensory perception of taste is a function of its concentration, it is not necessarily directly correlated to the acid's total concentration. Not intended to be limited by theory, Applicants believe that the sensory perception of taste is only capable of perceiving an acid in its associated form. Therefore, the portion of the total acid concentration in a dissociated state does not directly contribute to the taste perception of an acid's associated flavor note, nor the perception of characteristic flavors based on the combination of associated flavor notes.

It is understood by the ordinarily skilled artisan that acids exist in both an associated and dissociated state when present in aqueous solutions. The molecular equilibrium is expressed simply as:

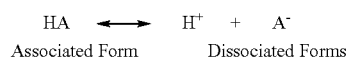

The anions may also be found in solutions containing salts of the acid. For a more detailed discussion of the mathematical relationships for this equilibrium see *Quantitative Chemical Analysis*, 4$^{th}$ Edition, by Daniel C. Harris, W.H. Freeman and Company, 1995, pp. 217-270, herein incorporated by reference. The dissociation constant $K_a$ for a given acid expresses the relationship of the three components of the equilibrium in terms of their molar concentrations:

$$K_a=([H^+] [anions])/[HA]$$

The hydrogen ion concentration is expresses by the symbol pH. The Henderson-Hasselbach equation relates the pH of a solution to the acid's $K_a$ value:

$$pH=\log ([anions]/[HA])-\log K_a$$

The negative logarithm of the dissociation constant is known as the $pK_a$ value in a similar manner to the pH value, which is the negative logarithm of the hydrogen ion:

$$pH-pK_a=\log ([anions]/[HA])$$

Changes in the pH of a solution result in different concentrations of a given acid's associated and dissociated forms, depending on that given acid's $pK_a$ value. Therefore, as the pH value of a solution changes so does the ability to perceive the taste of an acid's characteristic flavor note, or the characteristic flavor of a combination of specific flavor notes.

K. Identification of Flavor Characteristics to be Enhanced and Construction of an Enhanced Flavor Profile Creation As used herein, the term "Enhanced flavor profile" is defined as a flavor profile in which one or more flavor characteristics of that flavor profile have been removed, reduced, augmented, or combinations thereof. The term "enhanced flavor profile" is also defined to include a flavor profile to which a flavor characteristic note normally present in the flavor profile has been introduced. One of ordinary skill in the art will appreciate upon reading the disclosure herein that these definitions are not intended to be mutually exclusive, but may be combined in manner.

In one embodiment of the present invention an enhanced flavor profile (e.g. a target profile) is constructed from a coffee source component profile and a flavor source component profile. The enhanced flavor profile so constructed incorporates a subset of the characteristic flavor attributes of the flavor source component profile, not naturally present within the coffee source, with the coffee source component profile. In this embodiment the coffee source is a light roasted Columbian coffee and the flavor source is a hazelnut extract. The enhanced flavor profile (e.g., target profile) that results is indicative of a hazelnut flavored coffee.

In another embodiment of the present invention the coffee source is a dark roasted Brazilian coffee and the flavor source is a heavy cream. The enhanced flavor profile resulting from the combination of the two is indicative of a creamy, dark roasted Brazilian coffee.

In yet another embodiment of the present invention one or more flavor attributes characteristics of a given coffee source may be rendered imperceptible and/or reduced in Intensity to the sensory perception of taste. For example, an enhanced flavor profile may be constructed for a dark roasted coffee in which all the coffee source components attributable to flavor notes but those associated with the burnt, off-flavored notes are increased in concentration. This has the effect of in the enhanced flavor profile of minimizing the flavor contribution of those components associated with the burnt, off flavored notes, or rendering them imperceptible entirely.

In yet another embodiment of the present invention an enhanced flavor profile in constructed in which the concentration of one or more coffee source components associated with a preferred flavor characteristics are increased, relative to their concentration in the coffee source component profile. This would create a enhanced flavor profile indicative of a coffee beverage having a greater ability to deliver those desired flavor characteristics.

In selecting the particular coffee source components and flavor source components to add, remove, augment, and/or reduce in concentration to derive an acceptable and preferred enhanced flavor profile (e.g., target profile) factors such as The compatibility of particular flavor characteristics and the perceptibility of a given concentration of a coffee source or flavor source component should be considered. Applicants have found the following general guidelines valuable in constructing certain enhanced flavor profiles:

a) Increasing citric acid concentration increases the perception of roast color (i.e., imparts a lighter roasted flavor);

b) Increasing phosphoric acid concentration decreases the perception of roast color (i.e., imparts a darker roasted flavor);

c) Increasing malic acid imparts a greater creamy perception to a creamy coffee source and imparts a fruity flavor to black coffee sources;

d) Increasing fumaric acid increases the perception of heaviness to a given coffee source;

e) Increasing lactic acid imparts a greater creamy perception to a creamy coffee source and imparts a higher sourness to perception to black coffee;

f) Increasing acetic acid increases the astringency of black coffee sources and imparts a greater creamy flavor in black coffee sources;

g) Increasing 2-Furoic Acid imparts additional fruity notes to a given coffee source and imparts a lighter taste perception;

h) Increasing overall acidity makes a given coffee taste lighter and decreasing the acidity imparts a heavier taste perception.

L. Profile Matching and Manipulation

Each acid in coffee has an associated flavor note. Specific combinations of acids will exhibit a characteristic flavor profile based on the combination of associated flavor notes and the perceptible concentration of each of the acids in that combination. Therefore, flavor profiles can be identified for specific coffees and beverages of interest wherein the flavor profile for that coffee beverage is a function of the concentration of at a least a portion of the acids in that coffee. Mathematically, the characteristic flavor profile for a specific combination of acids is expressed as the relative ratio of the concentrations of those acids to each other within that combination.

$[A_1]:[A_2]:\ldots:[A_n]$, where $[A_{(1-n)}]$ is the total concentration of the first acid to the n$^{th}$ acid, respectively.

At a given pH, and depending on the pKa of the specific acid, a portion of the concentration of a specific acid will be in a form perceptible by taste (i.e., the associated form of the acid). And therefore, it has been found that what imparts the perceived characteristic flavor of a given profile is the combination of perceptible concentrations of the acids within that combination and their relative ratios to each other.

$[HA_1]:[HA_2]:\ldots:[HA_n]$, where $[HA_{(1-n)}]$ is the perceptible concentration of the first acid to the n$^{th}$ acid, respectively.

Applicants have discovered that the flavor profile of a given coffee beverage (e.g., a coffee source) may be readily adjusted so as mimic the characteristic flavor profile of a different coffee beverage (e.g., a target coffee) that has been enhanced to either add a characteristic flavor note, remove a characteristic flavor note, reduce a characteristic flavor note, augment a characteristic flavor note, or combinations thereof. As used herein, the term "mimic" is defined as approximating, imitating, or resembling in such a way as to deliver a substantially similar characteristic flavor.

As used herein, the term "corresponding acid" is defined as the acid of the same species. However, it will be appreciated by the ordinarily skilled artisan upon reading the disclosure herein that the corresponding acid does not necessarily have to exist in the same form as the acid of interest. The corresponding acid can exist in the associated form of the acid, the disassociated form of the acid, as a salt of the acid, or as combinations thereof. By way of example, if the acid of interest in a first coffee were malic acid then the corresponding acid in the second coffee would also be malic acid, though it may exist in a different form of the acid as described.

It will also be appreciated by those skilled in the art upon reviewing the disclosure herein, that although the majority of the acids commonly found in coffee and other beverages have an associated flavor note, not all of these acids will necessarily make a significant and/or preferred contribution to the characteristic flavor profile of a given coffee beverage. Applicants have found that of the acids typically present in coffee only a select set of those can be considered relevant acids.

As used herein, the term "relevant acid," as it applies to coffee acids, is defined as an acid that would be perceptible by taste at a concentration in water that is equal to the concentration of the acid in the target coffee and, has a concentration that varies according to the coffee roasting conditions selected, or the coffee region of origin, or the coffee species. Similarly stated, the term "relevant acid" is defined herein as one of the taste contributing acids found within coffee that would be perceptible by taste at a concentration in water that is equal to the concentration of the acid in the target coffee and exhibits one or more of the following phenomenon: a coffee roasting effect, a coffee species effect, or a coffee region of origin effect.

It will further be appreciated by the ordinarily skilled artisan in view of the disclosure herein, that not all of the coffee acids that satisfy the heretofore mentioned conditions (i.e., perceptibility in water, roast effect, species effect, and region of origin effect) would necessarily be required to sufficiently mimic a given flavor profile. Factors including, but not limited to, cost, availability, ease of use, manufacturing complexity, classification as a food grade acid by an appropriate regulatory agency such as the U.S. Food and Drug Administration, and commercially significant consumer preference differences between subtly different profiles need to be considered when selecting the exact number and species of relevant acids to be used in the mimicking of a given flavor profile.

As used herein, the term "relevant acid," as applied to acids of various non-coffee flavor sources, is defined as one of the acids of a given non-coffee flavor source that contributes the characteristic flavor profile of that given non-coffee flavor source. Though it will be appreciated by the ordinarily skilled artisan in view of the disclosure herein, that not all of the acids that contribute to the characteristic flavor profile of a given flavor source would necessarily be required to sufficiently mimic that given flavor source profile. Factors including, but not limited to, cost, availability, ease of use, manufacturing complexity, classification as a food grade acid by an appropriate regulatory agency such as the U.S. Food and Drug Administration, and commercially significant consumer preference differences between subtly different profiles need to be considered when selecting the exact number and species of relevant acids to be used in the mimicking of a given flavor source profile.

Therefore, it may be suitable to use only a subset of the relevant acids (i.e., the relevant coffee components and/or relevant flavor source components) identified within a given beverage to sufficiently mimic the characteristic flavor profile of that beverage.

As used herein, the term "principal acid" is defined as the relevant acid that experiences the largest change in its ratio between the total concentration of that acid in a first coffee (e.g., a coffee source) and the total concentration of the corresponding acid in a second coffee (e.g., a target coffee). By way of example, take a first coffee that contains three relevant acids, acid A, acid B, and acid C. The total concentrations of acids A, B, and C are 100 ppm, 150 ppm, and 200 ppm, respectively. Then take a second coffee which also contains corresponding acids A, B, and C. The total concentrations of the corresponding acids in the second coffee are 200 ppm, 450 ppm, and 300 ppm, respectively. The ratios of each acid in the second coffee to the corresponding acid in the first coffee (i.e., the total concentration of an acid in the second coffee divided by the total concentration of the corresponding acid in the first coffee) are 2 (200 ppm/100 ppm), 3 (450 ppm/150 ppm), and 1.5 (300 ppm/200 ppm), respectively. Therefore, of the relevant acids, acid B is the principal acid because it experiences the largest change in the ratio of its total concentration.

The Applicants have found that the ability to accurately measure changes in the concentration of a given acid within a coffee and/or other flavor source, analytically, is greater than the ability to measure a comparable change in concentration by the sensory perception of taste. The Applicants have also found that how closely the flavor profile of a first coffee and/or other flavor source needs to mimic the flavor profile of a second coffee and/or other flavor source (e.g. the total concentrations of relevant acids in a first coffee and/or other flavor source have substantially the same relative ratios to each to other as the corresponding relevant acids in the second coffee and/or other flavor source) to provide a suitable, consumer acceptable approximation of that flavor profile is a function of the ability to accurately perceive the difference between the two profiles, more than the ability to analytically measure the difference.

In one embodiment of the present invention Applicants have determined that for a characteristic flavor profile of a first set of relevant acids, such as would be found in an adjusted coffee (i.e., a coffee source that has been supplemented to mimic a target coffee), to be substantially similar to a characteristic flavor profile of a second set of relevant acids, such as would be found in a second or target coffee, so as to mimic the characteristic flavor profile of that second or target coffee the total concentration of the principal acid of the adjusted coffee must be within in the range of about 50% below to about 50% above the total concentration of the corresponding acid in the target coffee. The total concentration for the principal acid in the adjusted coffee is within the range of from about 40% below to about 40% above the total concentration of the corresponding acid in the target coffee is preferred, a total concentration in the range of about 30% below to about 30% above is more preferred, a total concentration in range of from about 20% below to about 20% above is yet more preferred, a total concentration in range of from about 10% below to about 10% above is yet more preferred, and a total concentration in range of from about 5% below to about 5% above is most preferred.

Moreover, the value of the total concentration of the principal acid of the adjusted coffee divided by the total concentration of each of the relevant acids of the adjusted coffee is within the range of from about 50% below to about 50% above the value of the total concentration of the corresponding principal acid in the target coffee divided by the total concentration of each of the corresponding relevant acids in the target coffee. In other words, for a given adjusted coffee that has N relevant acids, the value of the total concentration of the principal acid (i.e. the principal coffee component) of the adjusted coffee divided by the total concentration of each of the N relevant acids (i.e., the relevant coffee component) of the adjusted coffee is within the range of from about 50% below to about 50% above the value of the total concentration of the corresponding principal acid in the target coffee divided by the total concentration of each of the corresponding N relevant acids in the target coffee. A value in the range of from about 40% below to about 40% above is preferred, a value in the range of from about 30% below to about 30% above is more preferred, a value in the range of from about 20% below to about 20% above is yet more preferred, a value in the range of from about 10% below to about 10% above is yet more preferred, and a value in the range of from about 5% below to about 5% above is most preferred.

The acceptable variation between the relative ratios of relevant acids in a first coffee (e.g., an adjusted coffee) and the relative ratios of the corresponding relevant acids in a second coffee (e.g., a target coffee) is a function of the particular coffees selected and the ability to perceive a particular acid by the sensory perception of taste. So, in order for the characteristic flavor profile of the first coffee to mimic the characteristic flavor profile of the second coffee, the pH of first coffee must be adjusted in such a way that the perceivable concentrations of relevant acids in the first coffee have substantially the same relative ratios to each other as the perceivable concentrations of corresponding relevant acids in the second coffee. When the pH of the first or adjusted coffee is within the range of about 2 units above to about 2 units below the pH of the second coffee (i.e., the target coffee), preferably in the range of from about 1 unit above to about 1 unit below, more preferably in the range of from about 0.5 units above to about 0.5 units below, most preferably in the range of from about 0.2 units above to about 0.2 units below, the two coffees will have sufficiently similar perceivable concentrations of the relevant acids such that the characteristic flavor profile of the first or adjusted coffee will sufficiently mimic the targeted characteristic flavor profile of the second coffee.

As the perceptible concentration of a given relevant acid is a function of that acid's pKa value and the overall pH value of the solution, addition of a sufficient amount of one or more coffee source component modifiers will adjust the perceptible concentration of the relevant acid through adjustment of the overall pH value. These conditions can be expressed as follows:

$(0.5)(P_{Second\ Coffee}) \leq (P_{First\ Coffee}) \leq (1.5)(P_{Second\ Coffee});$  i)

$(0.5)[(P_{Second\ Coffee})/(R_{Second\ Coffee\ (n)})] \leq [(P_{First\ Coffee})/(R_{First\ Coffee\ (n)})] \leq (1.5)[(P_{Second\ Coffee})/(R_{Second\ Coffee\ (n)})]$, for each of $n$ relevant acids;  ii)

$pH_{First\ Coffee} = pH_{Second\ Coffee} \pm 2$ units  iii)

where $P_{First\ Coffee}$ is the total concentration of the principal acid in the first coffee, $P_{Second\ Coffee}$ is the total concentration of the corresponding principal acid in the second coffee, $R_{First\ Coffee\ (n)}$ is the total concentration of the $n^{th}$ relevant acid in the first coffee, $R_{Second\ Coffee\ (n)}$ is the total concentration of the corresponding $n^{th}$ relevant acid in the second coffee, $pH_{First\ Coffee}$ is the pH value of the first coffee, and $pH_{Second\ Coffee}$ is the pH value of the second coffee.

Applicants have further found that as it is the relative ratios of the relevant acids to each other that defines the characteristic flavor profile for that given set of acids, the absolute magnitude of the difference between the total concentrations of relevant acids between a first coffee and a second coffee is less critical in determining if the characteristic flavor profile of the first coffee is sufficiently similar to that of a second coffee so as to mimic that coffee's flavor profile. So, in another embodiment of the present invention, Applicants have determined that for a characteristic flavor profile of a first set of relevant acids, such as would be found in an adjusted coffee (i.e., a coffee source that has been supplemented to mimic a target coffee), to be substantially similar to a characteristic flavor profile of a second set of relevant acids, such as would be found in a second or target coffee, so as to mimic that characteristic flavor profile of that second or target coffee, the total concentration of those relevant acids may be increased by as much as a factor of seven (7) (i.e., a magnitude adjustment factor of between 1-7), as long as the relative ratios of the total concentration of the principal acid of the adjusted coffee is within in the range of about 50% below to about 50% above the total concentration of the corresponding acid in the target coffee, adjusted by the total magnitude adjustment factor. A total concentration for the principal acid in the adjusted coffee within the range of from about 40% below to about 40% above the total concentration of the corresponding acid in the target coffee, adjusted by the total magnitude adjustment factor, is preferred, a total concentration in the range of about 30% below to about 30% above, adjusted by the total magnitude adjustment factor, is more preferred, a total concentration in range of from about 20% below to about 20% above, adjusted by the total magnitude adjustment factor, is yet more preferred, a total concentration in range of from about 10% below to about 10% above, adjusted by the total magnitude adjustment factor, is yet more preferred, and a total concentration in range of from about 5% below to about 5% above, adjusted by the total magnitude adjustment factor, is most preferred.

Additionally, the value of the total concentration of the principal acid of the adjusted coffee divided by the total concentration of each of the relevant acids of the adjusted coffee should still be within the range of from about 50% below to about 50% above the value of the total concentration of the corresponding principal acid in the target coffee divided by the total concentration of each of the corresponding relevant acids in the target coffee. In other words, for a given adjusted coffee that has N relevant acids, the value of the total concentration of the principal acid (i.e. the principal coffee component) of the adjusted coffee divided by the total concentration of each of the N relevant acids (i.e., the relevant coffee component) of the adjusted coffee is within the range of from about 50% below to about 50% above the value of the total concentration of the corresponding principal acid in the target coffee divided by the total concentration of each of the corresponding N relevant acids in the target coffee. A value in the range of from about 40% below to about 40% above is preferred, a value in the range of from about 30% below to about 30% above is more preferred, a value in the range of from about 20% below to about 20% above is yet more preferred, a value in the range of from about 10% below to about 10% above is yet more preferred, and a value in the range of from about 5% below to about 5% above is most preferred.

Finally, in order for a the characteristic flavor profile of the first coffee to mimic the characteristic flavor profile of the second coffee, the pH of first coffee must be adjusted in such a way that the perceivable concentrations of relevant acids in the first coffee have substantially the same relative ratios to each other as the perceivable concentrations of corresponding relevant acids in the second coffee. When the pH of the first or adjusted coffee is within the range of about 2 units above to about 2 units below the pH of the second coffee (i.e., the target coffee), preferably in the range of from about 1 unit above to about 1 unit below, more preferably in the range of from about 0.5 units above to about 0.5 units below, most preferably in the range of from about 0.2 units above to about 0.2 units below, the two coffees will have sufficiently similar perceivable concentrations of the relevant acids such that the characteristic flavor profile of the first or adjusted coffee will sufficiently mimic the targeted characteristic flavor profile of the second coffee. As the perceptible concentration of a given relevant acid is a function of that acid's pKa value and the overall pH value of the solution, addition of a sufficient amount of one or more coffee source component modifiers will adjust the perceptible concentration of the relevant acid through adjustment of the overall pH value. These conditions can be expressed as follows:

$$(M)(0.5)(P_{Second\ Coffee}) \leq (P_{First\ Coffee}) \leq (M)(1.5)(P_{Second\ Coffee}); \qquad \text{i)}$$

$$(0.5)\ [(P_{Second\ Coffee})/(R_{Second\ Coffee\ (n)})] \leq [(P_{First\ Coffee})/(R_{First\ Coffee\ (n)})] \leq (1.5)[(P_{Second\ Coffee})/(R_{Second\ Coffee\ (n)})], \text{ for each of } n \text{ relevant acids;} \qquad \text{ii)}$$

$$pH_{First\ Coffee} = pH_{Second\ Coffee} \pm 2 \text{ units} \qquad \text{iii)}$$

where M is the magnitude adjustment factor and has a value in the range of from about 1 to about 7, $P_{First\ Coffee}$ is the total concentration of the principal acid in the first coffee, $P_{Second\ Coffee}$ is the total concentration of the corresponding principal acid in the second coffee, $R_{First\ Coffee\ (n)}$ is the total concentration of the $n^{th}$ relevant acid in the first coffee, $R_{Second\ Coffee\ (n)}$ is the total concentration of the corresponding $n^{th}$ relevant acid in the second coffee, $pH_{First\ Coffee}$ is the pH value of the first coffee, and $pH_{Second\ Coffee}$ is the pH value of the second coffee.

In one particularly preferred embodiment of the present invention the total concentration of the principal acid of the adjusted coffee is within in the range of about 50% below to about 50% above the total concentration of the corresponding acid in the target coffee, adjusted by the total magnitude adjustment factor; the value of the total concentration of the principal acid of the adjusted coffee divided by the total concentration of each of the relevant acids of the adjusted coffee is within the range of from about 50% below to about 50% above the value of the total concentration of the corresponding principal acid in the target coffee divided by the total concentration of each of the corresponding relevant acids in the target coffee; the pH of the first or adjusted coffee is within the range of about 2 units above to about 2 units below the pH of the second coffee (i.e., the target coffee); and, the value of the total concentration of the principal acid of the adjusted coffee divided by the total concentration of each of the relevant acids of the adjusted coffee is equal to the value of the total concentration of the principal acid of the target coffee divided by the total concentration of each of corresponding relevant acids in the target coffee. The last condition can be restated as the relative ratios of the principal and other relevant acids in the adjusted coffee to each other is equal to the relative ratios of the principal and other relevant acids in the target coffee to each other.

The conditions for this embodiment of the present invention can be expressed as follows:

$$(M)(0.5)(P_{Second\ Coffee}) \leq (P_{First\ Coffee}) \leq (M)(1.5)(P_{Second\ Coffee}); \qquad \text{i)}$$

$$(0.5)\ [(P_{Second\ Coffee})/(R_{Second\ Coffee\ (n)})] \leq [(P_{First\ Coffee})/(R_{First\ Coffee\ (n)})] \leq (1.5)[(P_{Second\ Coffee})/(R_{Second\ Coffee\ (n)})], \text{ for each of } n \text{ relevant acids;} \qquad \text{ii)}$$

$$pH_{First\ Coffee} = pH_{Second\ Coffee} \pm 2 \text{ units;} \qquad \text{iii)}$$

$$[(P_{First\ Coffee})/(R_{First\ Coffee\ (n)})] = [(P_{Second\ Coffee})/(R_{Second\ Coffee\ (n)})]$$

or alternatively as, $$[P_{First\ Coffee}]:[R_{First\ Coffee\ (1)}]:\cdots:[R_{First\ Coffee\ (n)}] = [P_{Second\ Coffee}]:[R_{Second\ Coffee\ (1)}]:\cdots:[R_{Second\ Coffee\ (n)}]. \qquad \text{iv)}$$

where M is the magnitude adjustment factor and has a value in the range of from about 1 to about 7, $P_{First\ Coffee}$ is the total concentration of the principal acid in the first coffee, $P_{Second\ Coffee}$ is the total concentration of the corresponding principal acid in the second coffee, $R_{First\ Coffee\ (n)}$ is the total concentration of the $n^{th}$ relevant acid in the first coffee, $R_{Second\ Coffee\ (n)}$ is the total concentration of the corresponding $n^{th}$ relevant acid in the second coffee, $pH_{First\ Coffee}$ is the pH value of the first coffee, and $pH_{Second\ Coffee}$ is the pH value of the second coffee.

M. Preparation of Enhanced Coffee Beverages and Compositions

FIG. 1 is a flow diagram of the steps for the process of the present invention. Referring to the FIGURE, step 102 is to select a the desired enhanced flavor characteristics to incorporate into the target coffee.

The target coffee may optionally contain additional elements, such as foaming agents, mouthfeel enhancing agents, flavorants, creamy components, inert fillers and carriers, sweetening agents, and the like.

Step 104 is to acquire the naturally occurring flavor source profile of the flavor source possessing the enhanced flavor characteristics.

Step 106 is to select a suitable coffee source. The coffee source can be in a variety of forms such as cherries, beans, leaves, and bark. Additionally, the coffee source can take the form of soluble coffee, roast and ground, roasted whole bean, green coffee, and extracts of coffee via aqueous, super-critical fluid, and organic solvent extraction processes. The coffee source can also be caffeinated, decaffeinated, or a blend of both.

Step 108 is to acquire the coffee source component profile showing the concentration of the coffee source components. Step 110 is to determine the pH value of the coffee source. The pH value is measured at standard temperature and pressure.

Step 112 is generating a target component profile incorporating the enhanced flavor characteristics. The generation method will depend on the exact flavor characteristics intended for enhancement. If the desired flavor characteristics is complementary to the flavor characteristics of the coffee source, the target profile is generated by combining the profile of the flavor source with the coffee source component profile. Complimentary flavor characteristics are those which have acid as a major contributor to the flavor. Examples include, but are not limited to, coffee, fruit, cocoa, and the like. It will be appreciated that in the generation of the target profile, flavor source components might be required that do not exist in the coffee source component profile, and visa versa. In such instances, the target profile will contain the flavor source component and the coffee source component in the concentrations that are present in their respective profiles.

If the desired flavor characteristic is non-complimentary to the flavor characteristics of the coffee source, the target profile is generated by combining a modified coffee source component profile with a flavor source component profile. In instances where the flavor characteristics of the coffee source are incompatible, the total concentration of compatible flavor source components is increased in a modified profile. In turn, the total concentration of incompatible flavor source components remains unchanged in the modified profile. The modified profile is then combined with the flavor source component profile to generate the target profile.

In one embodiment of the present invention a target coffee with raspberry flavor characteristics is desired. The acidic nature of the raspberry flavor characteristics are complimentary with those of the selected coffee source. The flavor source component profile of raspberry is combined with the coffee source component profile of the selected coffee source to generate the target profile.

In another embodiment of the present invention a target coffee with enhanced dairy flavor characteristics is desired in combination with a high acid instant coffee. The natural high acid content of the coffee source is inconsistent with the desired dairy flavor characteristic. It has been found that coffees naturally occurring high acid levels, when combined with buffered dairy compositions such as milk and cream, are perceived as having a disfavored, rancid taste.

The flavor source component profile of the desired flavor source is identified, as is the coffee source component profile. Additionally, the coffee source components that are consistent and inconsistent with the desired flavor characteristic are identified. The concentration of consistent coffee source components is increased in the target profile, while the concentration of inconsistent coffee source components remains unchanged. The concentration of flavor source components is then combined to generate the total target profile.

Step 114 is to select the appropriate flavor source component and the amount required to modify the coffee source component profile. The quantity of flavor source component required is determined by the difference between the total concentration of the coffee source component and the target component. If the total concentration of the coffee source component is less than the total concentration of the target component, a sufficient amount of a flavor source component is added so that the total concentration of the resulting coffee source component is at least equal to the total concentration of the target component. If the total concentration of the coffee source component is in excess of the total concentration of the target component, then the addition of a flavor source component is not required.

Step 116 is to select the appropriate coffee source component modifier, and the amount required, to adjust the perceptible concentration of the resulting coffee source component so that it is substantially similar to that of the target component. This will allow the coffee portion profile to appropriately mimic the target profile. The amount of coffee source component modifier required depends, in part, on the coffee source, the flavor source possessing the desired flavor characteristic, and the coffee element of target coffee selected.

Step 118 is to formulate the coffee portion by combining the selected flavor source components and the coffee source component modifier with the coffee source. As described above, the flavor source component and coffee source component modifier can exist and be applied in a variety of forms. Moreover, the application of the flavor source components and coffee source component modifier does not have to occur at the same moment. Additionally, the components can be applied at any point in the preparation of the coffee beverages or compositions of the present invention. Or, during the formation of any intermediate product used in the creation of the coffee beverages or compositions of the present invention.

Depending on the coffee source selected the flavor source components and the source component modifier can be delivered to the coffee beverages or compositions of the present invention: by a machine or other dispensing apparatus; by impregnating the ingredients in the lining of a cup; by impregnating the ingredients in a filter; by pre-measured tablet or packet; and, through the water used in various stages of product preparation (e.g., the roasting quench used to cool a post-roasted coffee, or the water used to create the final, consumable coffee beverage). The components and modifiers can be introduced via spraying, coating, soaking, co-mixing, or other suitable method.

If the coffee source is an agglomerated instant coffee product, components and modifiers of the present invention could be combined with the coffee source via part of an agglomeration binding solution (e.g., carbohydrate and/or starch, water, or other suitable surfactant); in a dry form that be part of the agglomeration; sprayed onto the agglomerated particle in liquid form; or, coated to an otherwise physically inert ingredient (e.g., sucrose, maltodextrin).

It will be appreciated by one skilled in the art upon reading the disclosure herein that one or more of the following steps may be omitted entirely or possibly performed on a periodic basis, possibly as part of a quality control program. Depending on the accuracy of the analytical data obtained on the various component profiles and the exact amount of supplemental coffee source component(s) and/or coffee source component modifier(s) added, the resulting coffee component profile and/or the pH value of the resulting coffee portion of the finished beverage can be calculated with sufficient accuracy to practice the present invention.

Step 120 is to acquire the resulting coffee component profile showing the total concentration of the resulting coffee source components. Step 122 is to determine the pH value of the coffee portion. The pH value is measured at standard temperature and pressure. Steps 124 and 126 require validating the results by comparing the resulting coffee component profile with the target coffee component profile and ensuring that the coffee portion is within an acceptable pH range of the coffee element of the target coffee.

One skilled in the art will appreciate that each and every step of the method described above is not required for every execution of the present invention. The exact sequence and number of steps required is also dependent on the particular execution of the present invention employed.

N. Examples

The following examples further describe and demonstrate embodiments within the scope of the present invention. These examples are given solely for the purpose of illustration and are not to be construed as a limitation of the present invention, as many variations thereof are possible without departing from the invention's spirit and scope.

1. Method for Determination of Coffee Components

The coffee components of the present invention are separated and quantified by Ion Chromatography (IC) utilizing alkaline anion-exchange with conductivity detection. The system is a Dionex DX 500 Ion Chromatograph comprising:
  i) IP25 Isocratic Pump;
  ii) EG-40 Eluent Generator;
  iii) Ion Pac ATC-1 anion-trap PN#37151;
  iv) AS50 Autosampler;
  v) LC30 Chromatography Oven;
  vi) Ion Pac AS-11HC column (4 mm×20 cm) (PN 052960);
  vii) Ion Pac AG-11-HC (PN 052962) guard column;
  viii) CD20 Conductivity Detector; and,
  ix) 4 mm ASRS-Ultra suppressor.

The chromatographic column consists of a 9-μm highly cross-linked macroporous ethylvinylbenzene-divinylbenzene resin core with 70-nm diameter microbeads of anion-exchange latex attached to the surface. The mobile phase is electrolytically generated from distilled-deionized water by using a Dionex EG-40 Eluent Generator and is characterized as follows:
  1. Eluent A: 18 Mohm-cm Milli-Q water or better, filtered through a 0.45 mm filter, degassed, and transferred to reservoir A with a continuous blanket of nitrogen.
  2. Eluent B: Potassium Hydroxide Cartridge (EluGen EGC-KOH EluGen cartridge, Dionex Inc.)

Deionized water is delivered by the pump to the EluGen Cartridge in the EG40. DC current is applied to the EluGen Cartridge to produce potassium hydroxide eluent. The resulting mobile phase gradient is described in Table 2 below.

TABLE 2

| time (min) | [NaOH] (mM) | Ramp |
|---|---|---|
| 0 | 1 | |
| 15 | 1 | isochratic |
| 25 | 15 | linear |
| 35 | 30 | linear |
| 60 | 60 | linear |

The column is kept at a temperature of 32° C. The flow rate is 1.5 mL/min and the injection volume is 10 μL. The data collection time is 55 minutes at a data collection rate of 5 points per second.

The above described analytical method is further disclosed in Dionex Corporation Application Note 123, "Determination of Inorganic Anions and Organic Acids in Fermentation Broths" and, Dionex Corporation Application Note 25, "Determination of Inorganic Anions and Organic Acids in Non-Alcoholic Carbonated Beverages", herein incorporated by reference.

The first step in the method for the identification, separation, and quantification of coffee components is to prepare an aqueous sample solution of the substance to be analyzed (coffee source, target coffee, or coffee portion). The aqueous sample solution must then be filtered to remove large suspended solids. A purified sample is then collected and analyzed using the above equipment.

By way of example, if the substance to be analyzed is roasted and ground coffee then first weigh 2.0 grams of R&G into a 100 ml volumetric flask. Add 50 ml of boiling HPLC water to the sample and boil on a hot plate for 10 minutes. Cool to room temperature and bring to volume with HPLC water. Then filter 2 ml through a 0.45 mm Nylon Membrane filter (acrodisc). Discard the first 1 ml and collect the second 1 ml in a sample vial and cap. Finally, analyze the purified sample using the above described equipment.

If the substance to be analyzed is a brewed coffee then filter approximately 2 ml through a 0.45 mm Nylon Membrane filter (acrodisc). Discard the first 1 ml and collect the second 1 ml in a sample vial and cap. Finally, analyze the purified sample using the above described equipment.

If the substance to be analyzed is a soluble coffee then weigh 1 gram of the soluble coffee into a 100 ml volumetric flask. Add 50 ml of boiling HPLC water to the sample. Swirl the solution to mix well, then cool and dilute to volume. Then filter 2 ml through a 0.45 mm Nylon Membrane filter (acrodisc). Discard the first 1 ml and collect the second 1 ml in a sample vial and cap. Finally, analyze the purified sample using the above described equipment.

If the substance to be analyzed is a coffee extract then it will need to be diluted in order to pass through the 0.45 mm Nylon Membrane filter (acrodisc). The extent of the dilution is dependent upon the viscosity of the particular sample to be analyzed. If the sample to be analyzed is in a form other than described above it will need to be prepared as outlined above. Samples that will not be analyzed shortly following preparation require refrigeration.

Calibration of the Ion Chromatography Method

One skilled in the art will appreciate that calibration is necessary to convert detector response to measures of concentration (e.g., parts per million, milligrams per liter, and the like). Calibration of the IC method is performed by preparing solutions of the free acids (when available as solids of sufficient purity) or of the sodium or potassium salts. Response factors (RF, ppm/peak area) were determined by a five level calibration for quinic, lactic, acetic, formic, malic, phosphoric and citric acids. Where the salts were used, gravimetric factors were applied such that the RF values corresponded to free acid concentration (ppm).

Quinic Acid

Quinic acid (Aldrich 77-95-2, 98% pure, FW=192.17 g/mol) was used. A primary stock solution was prepared by weighing 0.1015 g into a 100 mL volumetric flask. A secondary stock was prepared by 10-fold dilution. Five calibration solutions were made by successive 2-fold dilutions of the secondary stock. The fit was linear ($r^2$=0.9998) over a 6 to 100 ppm range.

Lactic Acid

Sodium lactate (Sigma L-7022, approx. 98% pure, FW=112.06 g/mol) was dried overnight in a desiccator containing $CaSO_4$. A primary stock solution was prepared by weighing 0.1079 g into a 100 mL volumetric flask. A secondary stock was prepared by 10-fold dilution. Five calibration solutions were made by successive 2-fold dilutions of the secondary stock. The fit was linear ($r^2$=0.9996) over a 5 to 85 ppm range.

Acetic Acid

Sodium acetate (Sigma S7545, 99.0% pure, FW=82.03 g/mol) was used. A primary stock solution was prepared by weighing 0.1035 g into a 100 mL volumetric flask. A secondary stock was prepared by 10-fold dilution. Five calibration solutions were made by successive 2-fold dilutions of the secondary stock. A quadratic fit ($r^2$=0.9999) was preferred to a linear fit ($r^2$=0.984) over the 5 to 75 ppm range.

Formic Acid

Sodium formate (Sigma S2140, 99.6% pure, FW=68.01 g/mol) was used. A primary stock solution was prepared by weighing 0.1007 g into a 100 mL volumetric flask. A secondary stock was prepared by 10-fold dilution. Five calibration solutions were made by successive 2-fold dilutions of the secondary stock. The fit was linear ($r^2=0.9990$) over a 4 to 70 ppm range.

Malic Acid

Malic acid (Aldrich 617-48-1, 99+% pure, FW=134.09 g/mol) was used. A primary stock solution was prepared by weighing 0.1020 g into a 100 mL volumetric flask. A secondary stock was prepared by 10-fold dilution. Five calibration solutions were made by successive 2-fold dilutions of the secondary stock. A quadratic fit ($r^2=0.9999$) was preferred to a linear fit ($r^2=0.985$) over the 6 to 100 ppm range.

Phosphoric Acid

Potassium phosphate, monobasic (Aldrich 7778-77-0, 99% pure, FW=136.09 g/mol) was used. A primary stock solution was prepared by weighing 0.1020 g into a 100 mL volumetric flask. A secondary stock was prepared by 10-fold dilution. Five calibration solutions were made by successive 2-fold dilutions of the secondary stock. Fit was linear ($r^2=0.9999$) over a 5 to 75 ppm range.

Citric Acid

Citric acid (Aldrich 77-92-9, 99+% pure, FW=192.12 g/mol) was used. A primary stock solution was prepared by weighing 0.1034 g into a 100 mL volumetric flask. A secondary stock was prepared by 10-fold dilution. Five calibration solutions were made by successive 2-fold dilutions of the secondary stock. A quadratic fit ($r^2=0.9999$) was preferred to a linear fit ($r^2=0.989$) over the 6 to 100 ppm range.

EXAMPLES

Example 1

In one embodiment of the present invention a target coffee beverage comprising a raspberry flavor characteristic is desired. A naturally occurring flavor source is then prepared (frozen raspberries are pureed, diluted and filtered to remove any sedimentation). This produces an aqueous solution of the non-coffee target source that has a total solids content of about 1.0% by weight.

A filtered 2 ml aliquot of the aqueous solution of the naturally occurring flavor source is then analyzed for total ion concentration of flavor source components. This done using a Dionex 500 HPLC system and the analytical method for determining ion concentration described above. A flavor source component profile is identified in PPM.

A coffee source is identified and processed (100% whole bean Columbian *Arabica* coffee, roasted for 15 minutes on a Jubilee type roaster to a Hunter color of 19.1 L). The coffee source is prepared by grinding the coffee using a Grindmaster Model 875 burr grinder on an ADC setting. A brew is prepared using 38 g of the roasted target coffee source per 1420 mL of distilled water in a Mr. Coffee type coffee brewer. This produces an aqueous solution that has a total solids content of about 0.5-1.0% by weight.

A filtered 2 ml aliquot of the aqueous solution of the coffee source is then analyzed for total ion concentration of a coffee source component using a Dionex 500 HPLC system and the analytical method for determining ion concentration described above. A coffee source component profile is identified in PPM.

The acidic flavor characteristic of raspberries is compatible with the high acid flavor characteristic of the selected coffee source. As such, the target profile is generated by the combination of acid concentrations in the flavor source component profile with the acid concentration in the coffee source component profile.

The quantity of the flavor source component to be added is calculated as the difference between the total ion concentration of the target component and the coffee source component, as is demonstrated in Table 3.

TABLE 3

|  | Acetic | Malic | Isocitric | Citric | Fumaric |
|---|---|---|---|---|---|
| Coffee Source Component Profile | 159.4 | 60 | 0 | 163.8 | 14.9 |
| Flavor Source Component Profile | 181.4 | 103.3 | 19.2 | 336.8 | 15.32 |
| Quantity of Flavor Source Component required | 22 ppm | 43.3 ppm | 19.2 ppm | 173 ppm | 0.42 ppm |

A quantity of a flavor source component, in an amount that is equal to or greater than the amount of the difference between the target component and the coffee source component, is combined with the coffee source. The flavor source component is added in its acidic form. However, the flavor source component may also be added as the Na$^+$ or K$^+$ salt of the acid.

The pH value of the coffee portion is then measured at standard temperature and pressure, and adjusted with a sufficient amount of a coffee source component modifier (NaOH) to be within +/−0.1 units of the pH of the coffee element of the desired pH value of the target coffee.

A filtered 2 ml aliquot of the coffee portion is then analyzed for total ion concentration using the analytical method for determining ion concentrations described above. A resulting coffee component profile is then identified in PPM and compared with the target component profile to ensure the component concentration levels in the coffee portion are within acceptable limits to the corresponding concentration levels in the target coffee.

Example 2

In one embodiment of the present invention a target coffee composition exhibiting an enhanced dairy flavor characteristics is desired. A filtered 2 ml aliquot of the aqueous solution of the naturally occurring flavor source is then analyzed for total ion concentration of flavor source components. This done using a Dionex 500 HPLC system and the analytical method for determining ion concentration described above. A flavor source component profile is identified in PPM.

A coffee source is identified and processed (Soluble instant coffee sold as Folgers brand instant coffee by the Procter and Gamble Company, Cincinnati, Ohio). A brew of the coffee source is prepared using 10 g of the soluble coffee source per 990 mL of hot distilled water. This produces an aqueous solution that has a total solids content of about 1.0% by weight.

A filtered 2 ml aliquot of the aqueous solution of the coffee source is prepared and analyzed for total ion concentration of a coffee source component using a Dionex 500 HPLC system and the analytical method for determining ion concentration described above. A coffee source component profile is identified in PPM.

As the desired dairy flavor characteristic is non-complimentary to the acid flavor characteristics of the desired coffee source, a target profile is then generated by combining the coffee source component profile with the flavor source component profile. The compatible and incompatible coffee source components are then identified. In instances where the flavor characteristics of the coffee source are incompatible, the total concentration of compatible flavor source components is increased in a modified profile. In turn, the total concentration of incompatible flavor source components remains unchanged in the modified profile. The modified profile is then combined with the flavor source component profile to generate the target profile.

The quantity of the flavor source component to be added is calculated as the difference between the total ion concentration of the target component and the coffee source component, as is demonstrated in Table 5.

TABLE 5

|  | Lactic | Acetic | Phosphoric | Malic | Formic | Citric |
|---|---|---|---|---|---|---|
| Coffee Source Component Profile | 51.4 | 80.9 | 85.0 | 28.7 | 47.1 | 110.8 |
| Flavor Source Component Profile | 15.0 | 108.0 | 20.1 | 51.0 | 0 | 0 |
| Target Component Profile | 66.4 | 188.9 | 105.1 | 79.7 | 47.1 | 110.8 |

A quantity of a flavor source component, in an amount that is equal to or greater than the amount of the difference between the target component and the coffee source component, is combined with the coffee source. The flavor source component is added in its acidic form. However, the flavor source component may also be added as the $Na^+$ or $K^+$ salt of the acid.

The pH value of the coffee portion is then measured at standard temperature and pressure, and adjusted with a sufficient amount of a coffee source component modifier (NaOH) to be within +/−0.2 units of the pH of the coffee element of the desired pH value of the target coffee.

A filtered 2 ml aliquot of the coffee portion is then analyzed for total ion concentration using the analytical method for determining ion concentrations described above. A resulting coffee component profile is then identified in PPM and compared with the target component profile to ensure the component concentration levels in the coffee portion are within acceptable limits to those in the target coffee.

Having now described several embodiments of the present invention it should be clear to those skilled in the art that the forgoing is illustrative only and not limiting, having been presented only by way of exemplification. Numerous other embodiments and modifications are contemplated as falling within the scope of the present invention as defined by the appended claims thereto.

We claim:

1. A method for altering a coffee source component profile of a coffee source to mimic a target coffee component profile of a target coffee, wherein the coffee source and the target coffee each comprise multiple taste contributing acids, the method comprising:
  a) determining the target coffee component profile of the target coffee by measuring concentrations for two or more taste contributing acids in the target coffee;
  b) determining the coffee source component profile for the coffee source by measuring concentrations for two or more taste contributing acids in the coffee source;
  c) comparing the target coffee component profile to the coffee source component profile to identify a principle taste contributing acid and one or more relevant taste contributing acids, wherein the principle taste contributing acid and the one or more relevant taste contributing acids correspond to taste contributing acids in the target coffee and the coffee source;
  d) adjusting concentration of the principle taste contributing acid in the coffee source to within a range of from about 50% to about 150% the concentration of the principle taste contributing acid in the target coffee; and
  e) adjusting concentration of each relevant taste contributing acid in the coffee source to a value of $R_{CS}$, wherein $R_{CS}$ is within a range expressed as:

$$(0.5)(P_{TC}/R_{TC}) \leq (P_{CS}/R_{CS}) \leq (1.5)(P_{TC}/R_{TC})$$

wherein:
  $P_{TC}$ is the concentration of the principle taste contributing acid in the target coffee;
  $R_{TC}$ is the concentration of the relevant taste contributing acid in the target coffee; and
  $P_{CS}$ is the concentration of the principle taste contributing acid in the coffee source;

to thereby alter the coffee source component profile of the coffee source to mimic the target coffee component profile of the target coffee.

2. The method of claim 1 wherein the coffee source comprises at least one taste contributing acid selected from the group consisting of acetic acid, lactic acid, malic acid, formic acid, citric acid, phosphoric acid, salts thereof and combinations thereof.

3. The method of claim 1 wherein the target coffee comprises at least one taste contributing acid selected from the group consisting of acetic acid, lactic acid, malic acid, formic acid, citric acid, phosphoric acid, salts thereof and combinations thereof.

4. The method of claim 1 wherein the concentrations of the principle taste contributing acid and the relevant taste contributing acids in the coffee source are adjusted by adding to the coffee source sufficient amounts of one or more components selected from the group consisting of a flavor source component, a coffee source component modifier, and combinations thereof.

5. The method of claim 4 wherein the flavor source component comprises at least two agents selected from the group consisting of acetic acid, lactic acid, malic acid, formic acid, citric acid, phosphoric acid, salts thereof and combinations thereof.

6. The method of claim 4 wherein the coffee source component modifier comprises at least one agent selected from the group consisting of sodium, magnesium, potassium, hydrogen, calcium, hydroxide and combinations thereof.

7. The method of claim 1 wherein the target coffee component profile is determined by measuring at least three taste contributing acids in the target coffee selected from the group consisting of acetic acid, lactic acid, malic acid, formic acid, citric acid, phosphoric acid, salts thereof and combinations thereof.

8. The method of claim 1 wherein the concentrations of the principle taste contributing acid and the relevant taste contributing acids in the coffee source are adjusted by adding to the coffee source one or more agents selected from the group consisting of acetic acid, lactic acid, malic acid, formic acid, citric acid, phosphoric acid, salts thereof and combinations thereof.

9. The method of claim 8 wherein the concentrations of the principle taste contributing acid and the relevant taste contributing acids in the coffee source are adjusted by adding to the coffee source at least three agents selected from the group consisting of acetic acid, lactic acid, malic acid, formic acid, citric acid, phosphoric acid, salts thereof and combinations thereof.

10. The method of claim 1 wherein the coffee source and the target coffee each comprise N relevant taste contributing acids, and where N is a number in the range of from about 1 to about 20.

11. The method of claim 1 wherein adjusting concentration of the principle taste contributing acid in the coffee source to within a range of from about 50% to about 150% the concentration of the principle taste contributing acid in the target coffee, comprises adjusting concentration of the principle taste contributing acid in the coffee source to within a range of from about 80% to about 120% the concentration of the principle taste contributing acid in the target coffee.

12. The method of claim 1 wherein adjusting concentration of the principle taste contributing acid in the coffee source to within a range of from about 50% to about 150% the concentration of the principle taste contributing acid in the target coffee, comprises adjusting concentration of the principle taste contributing acid in the coffee source to within a range of from about 90% to about 110% the concentration of the principle taste contributing acid in the target coffee.

13. The method of claim 1 wherein adjusting concentration of the principle taste contributing acid in the coffee source to within a range of from about 50% to about 150% the concentration of the principle taste contributing acid in the target coffee, comprises adjusting concentration of the principle taste contributing acid in the coffee source to within a range of from about 95% to about 105% the concentration of the principle taste contributing acid in the target coffee.

14. A method for mimicking a desired coffee flavor using a coffee source that does not exhibit the desired coffee flavor, wherein the coffee source comprises multiple taste contributing acids, the method comprising the steps of:
a) selecting a target coffee that exhibits the desired coffee flavor, wherein the target coffee comprises multiple taste contributing acids;
b) measuring concentrations for two or more taste contributing acids in the target coffee to determine a target coffee component profile, wherein the target coffee component profile correlates to the desired coffee flavor;
c) determining pH of the target coffee, wherein the pH value of the target coffee correlates to the desired coffee flavor;
d) selecting the coffee source that does not exhibit the desired coffee flavor;
e) measuring concentrations for two or more taste contributing acids in the coffee source to determine a coffee source component profile;
f) determining pH of the coffee source;
g) comparing the target coffee component profile to the coffee source component profile to identify a principle taste contributing acid and one or more relevant taste contributing acids, wherein the principle taste contributing acid and the one or more relevant taste contributing acids correspond to individual taste contributing acids in the target coffee and the coffee source;
h) adjusting concentration of the principle taste contributing acid in the coffee source to within a range of from about 50% to about 150% the concentration of the principle taste contributing acid in the target coffee; and
i) adjusting concentration of each relevant taste contributing acid in the coffee source to a value of $R_{CS}$, wherein $R_{CS}$ is within a range expressed as:

$$(0.5)(P_{TC}/R_{TC}) \leq (P_{CS}/R_{CS}) \leq (1.5)(P_{TC}/R_{TC})$$

wherein:
$P_{TC}$ is the concentration of the principle taste contributing acid in the target coffee;
$R_{TC}$ is the concentration of the relevant taste contributing acid in the target coffee; and
$P_{CS}$ is the concentration of the principle taste contributing acid in the coffee source;

j) adjusting pH of the coffee source, after adjusting concentrations of the principle taste contributing acid and the relevant taste contributing acids in the coffee source, to a pH value in the range of from about 2.0 units below to about 2.0 units above the pH value of the target coffee, to thereby mimic the desired coffee flavor.

15. The method of claim 14 wherein step j) comprises adjusting pH of the coffee source, after adjusting concentrations of the principle taste contributing acid and the relevant taste contributing acids in the coffee source, to a pH value in the range of from about 1.0 unit below to about 1.0 unit above the pH value of the target coffee.

16. The method of claim 14 wherein step j) comprises adjusting pH of the coffee source, after adjusting concentrations of the principle taste contributing acid and the relevant taste contributing acids in the coffee source, to a pH value in the range of from about 0.5 unit below to about 0.5 unit above the pH value of the target coffee.

17. The method of claim 14 wherein step j) comprises adjusting pH of the coffee source, after adjusting concentrations of the principle taste contributing acid and the relevant taste contributing acids in the coffee source, to a pH value in the range of from about 0.1 unit below to about 0.1 unit above the pH value of the target coffee.

18. The method of claim 14 wherein the desired coffee flavor is selected from the group consisting of a roast effect, a coffee species effect, a coffee region effect, and combinations thereof.

19. The method of claim 14 wherein the desired coffee flavor manifests consumer preferred flavor characteristics.

20. The method of claim 19 wherein the consumer preferred flavor characteristics are selected from the group consisting of sweet, sour, salty, bitter, soury, winey, acidy, mellow, bland, sharp, harsh, pungent, and combinations thereof.

21. A method of producing a coffee beverage composition having a desired coffee flavor, wherein the coffee beverage composition comprises a coffee source that does not have the desired coffee flavor, the method comprising the steps of:
a) performing the method of claim 14; and optionally
b) adding one or more additional flavor sources to the coffee beverage composition, to thereby produce the coffee beverage composition having the desired coffee flavor.

22. The method of claim 21 wherein the method further comprises the step of adding in one or more components selected from the group consisting of foaming agents, mouthfeel enhancing agents, creamy components, inert fillers, carriers, sweetening agents and any combination thereof.

23. The method of claim 21 wherein the one or more additional flavor sources are selected from the group consisting of compounds capable of imparting a characteristic flavor note associated with nuts, berries, dairy products, cocoa, vanilla, alcohols, liqueurs, caramel, mint, coffees, chocolates, cinnamon and combinations thereof.

24. The method of claim 23 wherein when one or more additional flavor sources comprise dairy products the concentrations of the principle taste contributing acid and the relevant taste contributing acids in the coffee source are adjusted by adding to the coffee source one or more agents selected from the group consisting of sodium phosphate, potassium phosphate and combinations thereof.

* * * * *